Dec. 7, 1926.
P. SZYDLOWSKI
1,609,440
DEVICE FOR LOCKING SPARE RIMS TO TIRE CARRIERS
Filed Feb. 4, 1926
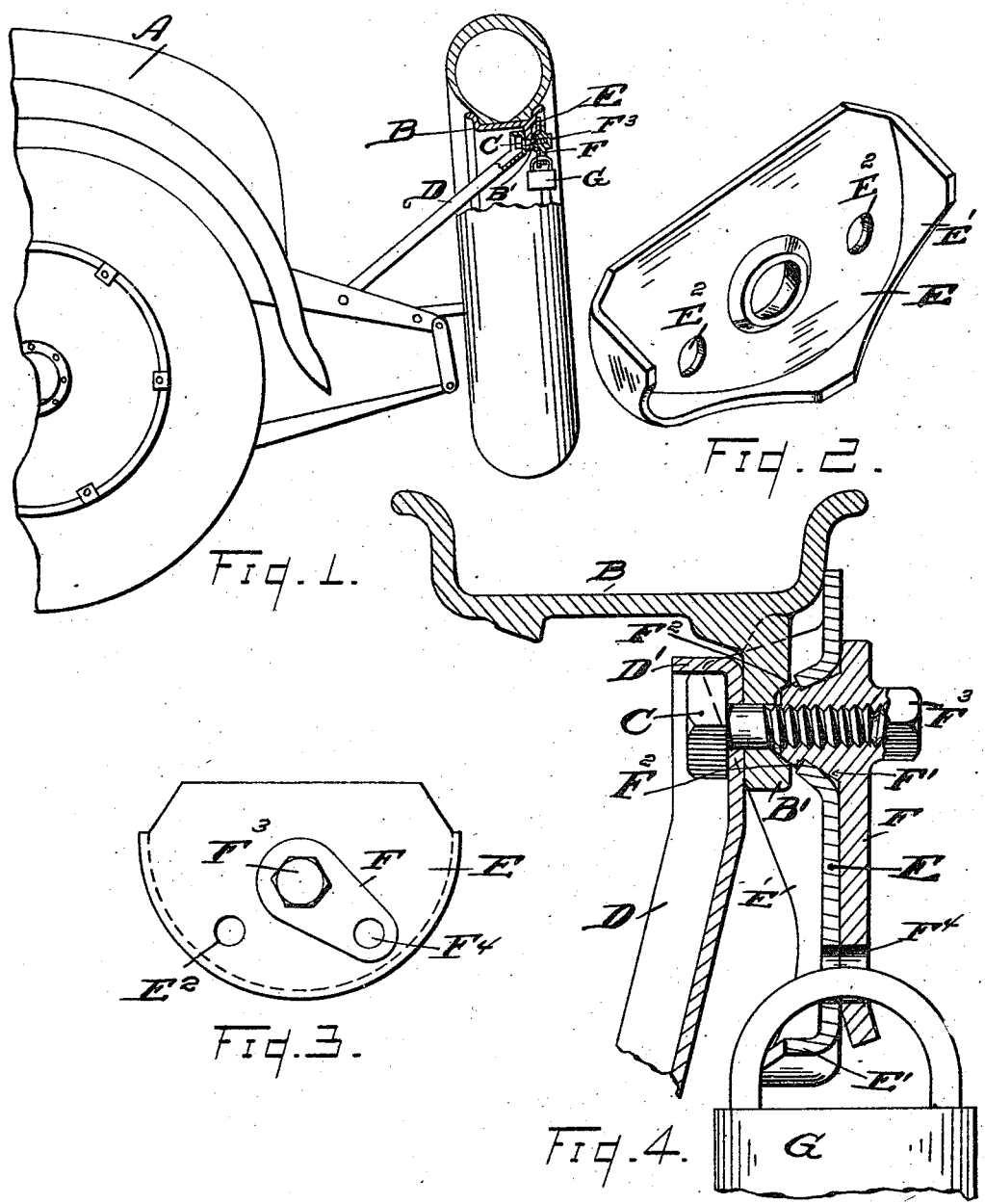

Patented Dec. 7, 1926.

1,609,440

UNITED STATES PATENT OFFICE.

PAUL SZYDLOWSKI, OF DETROIT, MICHIGAN.

DEVICE FOR LOCKING SPARE RIMS TO TIRE CARRIERS.

Application filed February 4, 1926. Serial No. 85,844.

My invention relates to a device for locking a spare rim and tire against theft when mounted upon the usual bracket attached to an automobile for carrying spare tires.

One of the objects of this invention is to provide a device of simple and inexpensive construction, adapted to engage any of the several bolts used to secure the spare rim and tire to the tire carier, in order to lock the spare tire and rim against unlawful removal or theft.

A further object of the invention is to provide a device comprising a swinging arm coupled to and cooperating with an element adapted to overlap one of the several lugs of the tire rim through which bolts extend for attaching the rim and tire to a wheel or to a spare tire carrier:—the swinging arm being tapped at one end to receive the bolt on which it oscillates and with a hole at the opposite end of the arm adapted to register with one or more holes provided in the overlapping element, that the shackle of a padlock may be inserted through the hole in the arm and one of the holes in the overlapping element to secure the rim and tire against unlawful removal from the tire carrier.

With the foregoing and other objects in view which will appear as the description proceeds the invention further resides in the combination and arrangement of parts and, in the details of construction hereinafter described and claimed it being understood that changes may be made in the precise embodiment of the invention herein disclosed without departing from the spirit of the same.

In the accompanying drawings forming part of this specification:

Figure 1 is a fragmentary side elevation of the rear end of an automobile showing a spare tire and rim partly in section secured to a tire carrier bracket.

Figure 2 is a perspective view of the overlapping apertured plate,—disconnected from the swinging arm,—adapted to be sleeved upon one of the bolts employed to secure the spare rim to a tire carrier bracket.

Figure 3 is an elevation of the overlapping apertured plate with a swinging arm having a hole adapted to register with the holes in the plate.

Figure 4 is a cross-sectional view showing the device as it would appear when locking a spare tire and rim to a tire carrier bracket.

Referring now to the letters of reference placed upon the drawings:

A denotes an automobile. B is a tire rim provided with lugs $B^1$ for the passage of bolts C by which the device may be secured either to the wheel rim or to a spare tire carrier D.

E is a disc-shaped plate having a flange $E^1$ of irregular contour overlapping the tire rim as indicated in Figure 2 of the drawings.

F is a swinging arm having a tapering hub $F^1$ conforming to the tapering wall surrounding the hole in the disc in which it is secured by the overlapping end $F^2$ of the arm thereby providing a unitary device.

The hub of the swinging arm F is tapped for a portion of its length to receive the threaded end of the bolts C, and in axial alignment therewith on the outer face of the arm is a projecting polygonal lug $F^3$, for applying a wrench whereby the swinging arm may be readily screwed upon the end of the bolt.

The swinging arm F is also provided at its outer, or free end with a hole $F^4$ which upon swinging the arm may be brought into registration with either of the holes $E^2$ in the plate E to receive the shackle of a padlock G, which when inserted through the holes in the swinging arm F and disc E, and locked, secures the rim and tire against unlawful removal from the spare tire carrier.

It will be readily understood upon reference to Figure 3 of the drawing that the bolt C is held against removal, or turning when adjusting the swinging arm and disc thereon, by the flange $D^1$ of the carrier bracket which lies adjacent one of the sides of the bolt head; so also the flange $E^1$ of the overlapping plate E will engage the tire rim to prevent removal if an attempt is made to unscrew the swinging arm from the bolt.

Having thus described my invention what I claim is:

1. In a device of the character described, a disc adapted to overlap a portion of a tire rim, a swinging arm having a hub tapped to receive a bolt and seated in a socket formed in the wall of the disc, and locking means adapted to engage the free end of the arm to the disc.

2. In a device of the character described, a disc having a plurality of perforations with a flange adapted to overlap a portion of a tire rim, a swinging arm tapped to receive a bolt and provided with a hole at its free end adapted when adjusted to register with perforations in the disc, and a lock having a shackle adapted to extend through the holes in the arm and disc.

3. In a device of the character described comprising a disc having a plurality of perforations through its wall and a flange adapted to overlap a portion of a tire rim, a swinging arm having a tapped tapering hub seated in a corresponding tapering socket formed in the wall of the disc, with a hole at the free end of said arm adapted to be brought into registration with the several perforations through the disc, said swinging arm having also a squared lug in axial alignment with the hub of said arm, to receive a wrench.

4. In combination with a spare tire carrier, a demountable tire rim, bolts for securing the rim to the tire carrier, a disc adapted to overlap a portion of the rim having a plurality of perforations through the wall and a flange extending at right angles to its marginal edge, a swinging arm having a tapering socket tapped to receive one of the tire rim bolts said hub being seated in a correspondingly tapered socket formed in the wall of the disc, the hub of said swinging arm extending beyond and overlapping the edge of the tapering socket, whereby the swinging arm and disc are coupled together as a unit, said swinging arm having a hole at its free end adapted to register with one of the holes in the disc, and locking means having a shackle adapted to extend through the hole in said swinging arm and one of the perforations in said disc.

5. In a device of the character described, a spare tire carrier, a demountable tire rim provided with lugs perforated for bolts, bolts for securing the rim lugs to the tire carrier, a disc having a plurality of perforations with a flange adapted to overlap one of the lugs of the tire rim, a swinging arm tapped to receive one of the bolts for securing the rim to the carrier, means for securing the bolt against rotation, when screwing the arm upon the bolt, said swinging arm being provided with a hole at its free end adapted when adjusted to register with one of the perforations in the disc, and locking means having a shackle adapted to extend through the hole in said swinging arm and one of the perforations in said disc.

6. In combination with a spare tire carrier, a demountable tire rim, a disc adapted to overlap a portion of the tire rim having a hole for the passage of a bolt, a bolt supported in the frame of the carrier adapted to engage the tire rim and project through the hole in the disc, removable means screwed upon the end of the bolt, and means for securing said means upon the bolt.

In testimony whereof, I sign this specification.

PAUL SZYDLOWSKI.